July 4, 1967     F. L. CARSON     3,329,445

EXTENSIBLE ALIGNING TOW BAR

Filed Oct. 18, 1965

3,329,445
EXTENSIBLE ALIGNING TOW BAR
Forrest L. Carson, P.O. Box 1594, Borger, Tex. 79007
Filed Oct. 18, 1965, Ser. No. 497,407
1 Claim. (Cl. 280—478)

ABSTRACT OF THE DISCLOSURE

The disclosure is directed to a trailer tow bar which is extensible and movable to permit connection of the tow bar to a misaligned towing vehicle. The structure of the tow bar is such that after connection the backing of the tow vehicle will cause the trailer to align with the tow bar locked in retracted position.

---

The present invention relates to an extensible aligning tow bar for coupling a towed vehicle to a towing vehicle.

The primary object of the present invention is to provide a tow bar which can be extended and moved to align the couplings of a towed and towing vehicle to permit ease of connection of the couplings.

Another object of the invention is to provide an extensible aligning tow bar which can be moved when coupling a towed to a towing vehicle in a linear, vertical or horizontal direction and combinations of these directions.

A further object of the invention is to provide a tow bar of the class described above which can be mounted on either the towing vehicle or the towed vehicle as desired.

Figure 1:
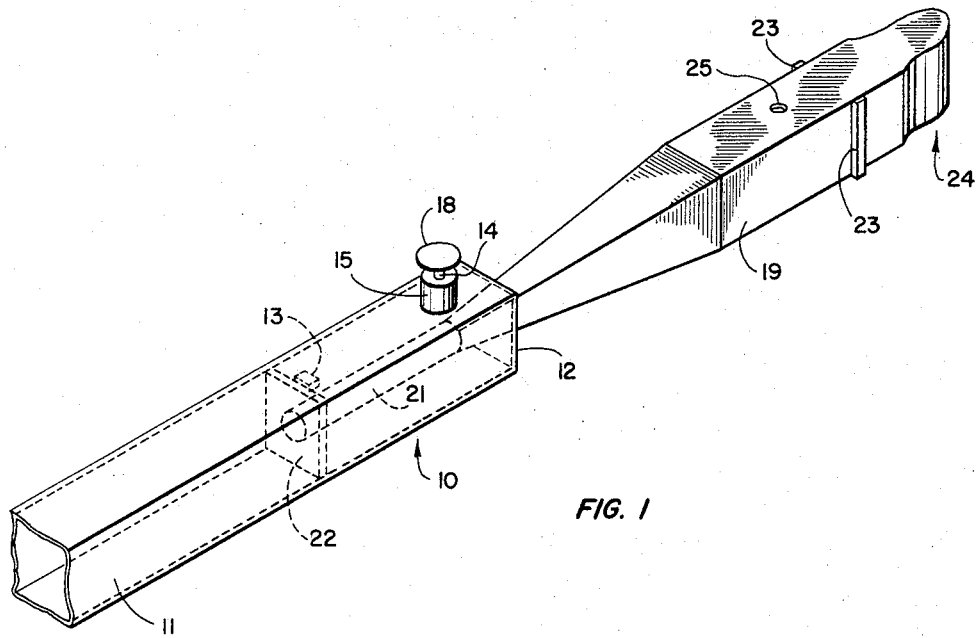
Figure 2:
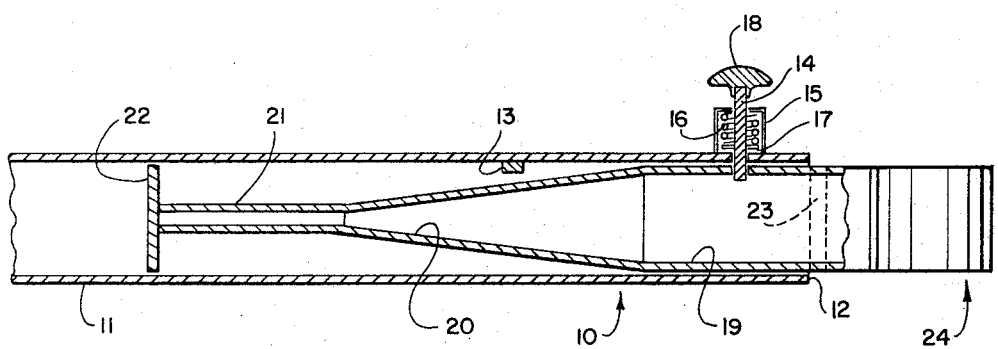

Other objects and advantages will become apparent in the following specification when considered in light of the attached drawings in which, FIGURE 1 is a perspective view of the invention shown in extended position partially broken away for convenience of illustration, and FIGURE 2 is a vertical cross section of the device in retracted position partially broken away for convenience of illustration.

Referring now to the drawings in detail wherein like reference characters indicate like parts throughout the several figures the reference numeral 10 indicates generally a tow bar constructed in accordance with the invention.

The tow bar 10 includes an elongated generally rectangular tube 11 which is adapted to be attached to either the towed or towing vehicle in a position so as to extend parallel to the direction of travel of the vehicle and generally horizontal with respect to the ground. The tube 11 has an open outer end 12 opposite to the vehicle to which it is attached and has a stop 13 secured internally thereof inwardly from the outer end 12 for reasons to be assigned.

A lock pin 14 is mounted on the tube 11 so as to extend through a spring housing 15 into the interior of the tube 11. A coil spring 16 is mounted in the spring housing 15 and is arranged in engagement with a stop 17 on the lock pin 14. The coil spring 16 normally urges the pin 14 into the tube 11. A retracting handle 18 is mounted on the upper end of the lock pin 14 for retracting the lock pin 14 out of the tube 11.

A second generally rectangular tube 19 has an external size slightly smaller than the internal size of the tube 11 to permit is to be freely reciprocated within the tube 11 as can be seen in FIGURE 2. The tube 19 has an inwardly tapered central portion integrally formed on one end thereof and arranged axially of the tube 19. A cylindrical tubular extension 21 is integrally secured to the smaller end of the tapered central portion 20 in axial alignment therewith and extending oppositely of the tube 19. A generally rectangular plate 22 has an external size slightly smaller than the internal size of the tube 11 so that it can freely reciprocate therein. The plate 22 is secured to one end of the cylindrical extension 21 and extends perpendicularly to the axis thereof.

A pair of vertically extending stops 23 are secured to opposite side faces of the tube 19 and are arranged to engage the end 12 of the tube 11 when the tube 19 is completely retracted into the tube 11. A hitch generally indicated at 24 is integrally formed on the outer end of the tube 19 and is adapted to cooperate with a hitch on a towing or towed vehicle as the case may be, in order to secure the two vehicles in coupled relation.

In the prior art coupling of towed and towing vehicles the hitch structures were rigidly secured to each of the vehicles and it was necessary that the whole vehicle be moved in order to align one of the hitches with the other so that coupling could take place. In the case of extremely heavy vehicles the movement of one vehicle with respect to the other by hand has often been impossible and the coupling could only be made by moving one of the vehicles with a power means such as a jack in order to align them sufficient to permit the coupling. With the present invention the towing vehicle is driven to a position so that its hitch is close to the hitch of the towed vehicle. The pin 14 is retracted from the keeper hole 25 in the tube 19 so that the tube 19 with its hitch 24 can be slid forwardly in the tube 11. The stop 13 prevents the plate 22 from moving beyond the position shown in FIGURE 1. The tube 19 in its extended position as shown in FIGURE 1 can then be swung from side to side, up and down, and can be slid in and out in order that the hitch 24 can be coupled with the hitch on the other vehicle. After the hitch 24 is coupled to the other hitch the wheels of the towed vehicle are chocked to prevent movement rearwardly and the towing vehicle is then backed toward the towed vehicle to telescope the tube 19 into the tube 11 until the lock pin 14 is spring pressed into the keeper hole 25. With the tube 19 locked in its innermost position within the tube 11 the towing vehicle can then move forwardly with the towed vehicle being moved in a normal manner rigidly connected to the towed vehicle except for the pivotal action permitted by the respective conventional hitches.

It should be understood that while I have disclosed my invention with generally rectangular tubes any shape tube may be used so long as the two tubes are so keyed together that relative axial rotation will not take place therebetween.

Having thus described the preferred embodiments of the invention it should be understood that numerous structural modifications and adaptations may be resorted to without departing from the scope of the appended claim.

I claim:

An extensible vertically and horizontally alignable tow bar attachment for trailers comprising an elongated generally rectangular tube adapted to be secured to the trailer, a second generally rectangular tube slightly smaller than said first tube said second tube being telescopically slidably mounted in said first tube with the relative dimensions of said tubes such that axial relative rotation between said tubes is prevented, a tapered extension on the end of said second tube extending inwardly of said first tube, said tapered extension having a generally rectangular cross section, a generally rectangular plate secured to the free end of said tapered extension perpendicularly to the axis of said second tube, said rectangular plate having dimensions about equal to said second tube for freely sliding within said first tube, means on said second tube for engagement with said first tube to limit the inward movement of said second tube with respect to said first tube, means on said first tube arranged to detachably lock said second tube in retracted position within said first tube and means on said second tube adapted to engage said plate with said second tube in fully extended position to retain said second tube in engagement with said first tube.

References Cited
UNITED STATES PATENTS

| | | | |
|---|---|---|---|
| 2,845,281 | 7/1958 | Holder et al. | 280—478 |
| 3,019,032 | 1/1962 | Oehler et al. | 280—478 |
| 3,279,819 | 10/1966 | Edmonds | 280—478 |

FOREIGN PATENTS 839,387   6/1960   Great Britain.

LEO FRIAGLIA, *Primary Examiner.*